Patented Apr. 16, 1946

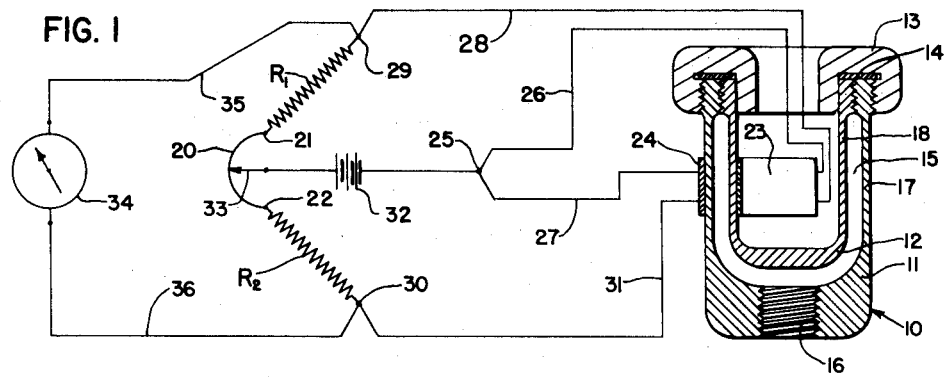

2,398,372

UNITED STATES PATENT OFFICE

2,398,372
DEVICE AND SYSTEM FOR PRESSURE MEASUREMENT

Christopher A. Green, University City, Mo., assignor to Curtiss-Wright Corporation, a corporation of Delaware Application January 11, 1944, Serial No. 517,869

2 Claims. (Cl. 201—63)

This invention relates to pressure indicating systems and is more particularly concerned with improvements in an extremely sensitive strain-type pressure responsive unit for use in an indicating or recording system.

An important object is the provision of a sensitive pressure responsive unit which may experience a measurable amount of deformation due to pressure effects, and in which the deformation characteristics of the unit are physically related with or directly proportional to the existing pressure characteristics.

A further object is exemplified by the form and construction of the pressure responsive unit in which a pressure chamber or cell is defined, in part at least, by pressure sensitive or deformable walls whereby wall deformation, either in the expanding or contracting sense, may be utilized to produce a desired effect in an indicating or recording system associated therewith.

Another object resides in the arrangement of the pressure sensitive unit for use with electrical type strain gauges and wherein the deformation of the pressure sensitive wall portions of the unit is employed to produce a change in the resistance value of the associated strain gauges and consequently a change in an initially balanced electrical bridge circuit, which is associated with the electric strain gauges.

An additional object of this invention is the provision of a compact yet sensitive pressure responsive unit, particularly adapted for use in restricted or closed locations, and one which may be made to give indications or pressure conditions through the interposition of an electrically responsive system including electric strain gauges in temperature compensating association with a balanced bridge system, together with indicating or recording instruments.

A more exact understanding of the invention may be had from the following detailed description and from the accompanying drawing, in which:

Fig. 1 illustrates one form and construction of the pressure sensitive unit associated with a simple electrical bridge circuit and visual indicator, Fig. 2 illustrates a modified form of the pressure sensitive unit utilized in a more advanced electrical bridge circuit adapted for visual indication of pressure characteristics, and Fig. 3 is a further form of pressure sensitive unit associated with an electrical bridge circuit in which indicating or recording instruments may be employed.

Referring now to the drawing and with particularity to Fig. 1 thereof, the sensitive pressure responsive unit 10 is comprised of an outer body 11 of general thimble form, an inner thimble or body 12 threadedly united with the outer body, and a closure cap 13 threaded onto the outer body. The cap, with the aid of a flat gasket or washer 14, forms a pressure-tight seal for the adjacent ends of the associated thimble-like bodies. An annular chamber or space 15 is provided between the outer and inner bodies, and an inlet port 16 formed in the base of the outer body 11 admits a medium under pressure to the chamber 15. The important structural characteristic of the described unit 10 is exhibited by the circumferentially extending thin-wall portions 17 and 18 of bodies 11 and 12 respectively and the provision of relatively thickened end portions for each body. As a result, pressure existing or permitted to exist in chamber 15 tends to expand the outer body element or member 11 and compress the inner member 12. However the considerably thickened end portions of the unit resist most strongly the deformation due to this pressure while the more sensitive or thin-wall zones 17 and 18 experience substantially all the deformation. The principal axis of deformation extends circumferentially of the unit and particularly within the longitudinal extent of the walls 17 and 18. It will be observed that the outer thin-wall 17 experiences with positive pressures, for example, a tendency to expand or increase its circumferential dimension, while the inner thin-wall 18 undergoes a decrease in its circumferential dimension. Hence the sensitive walls undergo simultaneous deformation in opposite senses.

With a pressure responsive and sensitive unit of the type above described, the measurement of pressure in chamber 15 then becomes a problem of measuring the extent of the body wall deformation in its principal or circumferential axis. It is important in the construction of the unit 10 to choose suitable thickness dimensions for the thin-wall portions 17 and 18, such that the resulting deformation shall have a direct or proportional relation with the pressure existing within chamber 15. It is also preferred that the material of which the unit is formed be characterized as having a linear or substantially linear stress-strain curve. Where the material fails to develop a linear stress-strain curve or lacks characteristics of that nature, a calibration curve may be developed for a useful pressure range. For normal and high positive pressure ranges, the use of aluminum, steel, or alloys of each may be found expedient. For example, a pressure unit constructed of commercial aluminum of the 24ST character has proved extremely practical for working pressures as high as 2500 to 3000 p. s. i. and as low as 500 p. s. i. For low pressure use, recourse may be had to a material possessing a deflection or deformation characteristic sufficient to permit a measurable change in circumferential dimension. In this later category, there is necessarily included plastics and phenolic resins generally.

A convenient and very accurate means by which measurement of the extent or degree of wall deformation may be had involves the employment of commercially available resistance type electrical strain gauges arranged in accordance with the well-known Wheatstone bridge circuit, and in which the strain gauges become one or more of the resistance legs of the bridge. The expression "bridge circuit" shall be understood as referring to the Wheatstone bridge. The bridge circuits also include a source of direct current such as a dry cell or wet-plate battery and an indicator means of the galvanometer type. More specifically, a simple electrical indicating circuit arrangement, which may be useful with the pressure sensitive unit 10 above described, includes constant resistances $R_1$ and $R_2$ serially connected through a balancing potentiometer resistance element 20 as at 21 and 22 respectively. It is preferred that the fixed or constant resistance elements $R_1$ and $R_2$ be substantially equal. The opposite side of the bridge circuit comprises an electrical strain gauge 23 associated with the internal surface of the inner thimble body 12 and a second electrical strain gauge 24 associated with the external face of the outer thimble body 11. The strain gauges 23 and 24 have a common connection at terminal 25 through conductors 26 and 27, respectively. Strain gauge 23 is also connected through conductor 28 with the terminal end 29 of resistance $R_1$, while strain gauge 24 connects with the terminal end 30 by means of the conductor 31. The current source or battery 32 is connected into the bridge circuits at terminal 25 and to the adjustable arm 33 of the balancing potentiometer. A suitable current flow meter or galvanometer 34 is connected by conductors 35 and 36 to the bridge terminals 29 and 30 respectively. The galvanometer 34 functions in the well-known manner to indicate the direction of current flow in the bridge circuit.

The electrical strain gauges, in order that they will be accurate and representative of the actual wall strain due to pressure effects, are carefully and completely bonded in any suitable manner to the surface of the wall so that they will be strained identically with the wall over the full range of pressures which may be encountered. The theory and application of resistance type strain gauges is well known and hence an extended discussion is deemed unnecessary. Suffice it to say that such gauges are characterized by an electrical conductor which is extensible and contractible and which, therefore, offers a resistance to the flow of an electric current which increases as the conductor is extended and decreases as the conductor is permitted to contract. In the present invention, it is proposed to take advantage of the change of resistance characteristic of the strain gauge and to translate that condition into electrical values which have a direct or proportional relation with a pressure condition encountered or requiring observation and study.

In operation, the invention contemplates that the improved and novel pressure sensitive or sensing unit 10 will react to pressure conditions desired to be studied, whether such pressure be static, dynamic, or rapidly fluctuating in character, in a direct or proportional manner and that the strain produced in the sensitive wall portion of the unit shall be converted by the strain gauges directly to electrical units which may be indicated or recorded. To do this, the electrical type strain gauges are intimately associated with the strained surface and are most generally positioned with the major or principal axis thereof in coincidence with the principal axis of strain of the sensitive surface. The gauges are inserted in a bridge circuit of Wheatstone type and act to produce current flow conditions therein capable of being indicated or recorded. An important and advantageous characteristic of the pressure sensitive unit is its arrangement for automatically compensating for temperature conditions. The strain sensitive surfaces 17 and 18 necessarily undergo the same degree of expansion or contraction with changes of temperature and hence the associated strain gauges are affected in the same degree and to the same extent. Accordingly temperature conditions have no serious or appreciable effect on the electrical measuring system.

A modified pressure sensitive unit 40 and electrical circuit is illustrated in Fig. 2. However, the theory of its use and operation is not different from that already set forth in connection with the arrangement of Fig. 1. The principal structural differences reside in the method of effecting a sealed joint between the inner and outer thimble members 41 and 42. As shown the thimble members 41 and 42 are threadedly assembled and the resulting joint is then welded closed as at 43. This results in a permanently sealed structure and one well adapted for use in high pressure work. The thimbles 41 and 42 are arranged in internally spaced relation, thereby providing an annular and cup-shaped chamber 44. This chamber is placed in communication with a source of pressure through port 45 provided in the thickened base of the outer member 42. The pressure sensitive wall portions 46 and 47 of the outer and inner body members 42 and 41, respectively, are circumferentially stressed in the same manner as the corresponding sensitive wall portions of the previously described pressure unit 10.

The electrical indicating system associated with the pressure unit 40 comprises a Wheatstone bridge circuit in which strain gauges constitute the four arms or branches of the bridge. For example, strain gauges 48 and 49, securely cemented or bonded to the interior face of the cupped member 41 and arranged in a circumferential position, are connected across bridge terminals 50—51 and 52—53, respectively, by means of two strand conductors 54 and 55 respectively. Similarly, strain gauges 56 and 57 circumferentially arranged and cemented to the outer surface of the cupped member 42, as indicated, are electrically connected respectively across bridge terminals 50—52 and 51—53 by two strand conductors 59 and 60 respectively. A balancing type potentiometer element 61 is inserted between strain gauge legs 49 and 57 and the movable contact arm 62 of this potentiometer is connected to one lead 63, the latter lead being connected through the battery 64 to the bridge terminal 50. The indicating galvanometer 65 is connected in the bridge circuit between terminals 51—52 as shown.

In operation the use of four strain gauges, two on the interior face of the unit and two on the exterior face, is found to be of considerable advantage in that there results greater current flow conditions and better temperature compensation. This advantage is most useful for oscillograph or recording instruments where the increased current flow is important for enhanced signal output. Moreover, the use of four strain gauges is advantageous when it is considered that a greater area of the sensitive wall portions of the pressure unit may be utilized for sensing and observing pressure conditions occurring within the chamber 44.

A further modification in the structural arrangement of the pressure sensitive unit is shown in connection with the improved circuit arrangement of Fig. 3. In this system the pressure sensitive unit 70 is essentially similar to the previously described units 10 and 40 but differs in respect of the sealed joint between the outer and inner elements 71 and 72 respectively. In place of the gasket or washer element 14 or the welded seal 43, units 10 and 40 respectively, a jam fit seal is employed for the members 71 and 72 when assembled and this form of seal permits ready separation of the parts. One means of forming the jam type seal is to provide each member with complementary beveled faces 73 and 74 which come into face-to-face contact when member 72 is threaded into the member 71 as shown. Suitable tool engaging faces or flats 75 are provided about the outer margins of each body member to facilitate assembly and disassembly of these parts of the unit 70.

The pressure sensitive unit 70 is provided with a pair of interiorly positioned strain gauges 76—77 which are cemented or bonded to the sensitive wall zone of the inner body member 72 so as to be strained directly with the circumferential wall strain. A second pair of strain gauges 78—79 bonded to the exterior wall surface of the member 71 in the zone of the sensitive wall area are adapted to be strained along with the wall strain produced by a pressure condition within the chamber or space 80 of the unit 70. The chamber 80 is placed in direct communication with a pressurized conduit or body 81 or any other source of pressure or a space under pressure by a suitable connecting conduit 82. The several strain gauges 76, 77, 78 and 79 are connected in a Wheatstone bridge circuit at terminals 83, 84, 85 and 86 in the usual manner so as to constitute the four arms of the bridge. A current source 87 connects into the bridge at terminals 83—85 and the bridge output terminals are at 84 and 86. While a conventional galvanometer may be connected at the bridge output, it is preferred to incorporate an amplification unit, as at 88, and to insert an oscillograph or recording instrument, as at 89. The advantage of this latter arrangement lies in the fact that very small current values in the bridge circuit may be picked up and amplified by the unit 88 for use in the instrument 89 selected or best adapted to the observations being made. Moreover, the current source 87 may be either direct or alternating current as desired, and if alternating current the units 88 and 89 must also be adapted for alternating current.

The above-described electrical circuit arrangement is intended to illustrate the advantages and utility of the sensitive pressure cell or unit when combined with an equally sensitive indicating means, or an oscillograph or recording type instrument. While the last-described unit 70 is shown in connection with a conduit or body 81 containing a medium under pressure, it must be understood that the pressure unit in any of its described forms or equivalents may be utilized to advantage therewith or in many other arrangements not specifically shown or mentioned. It is herein preferred to utilize the pressure sensitive cell or unit in conjunction with four electrical strain gauges, so that the greatest accuracy in observing pressure conditions and characteristic pressure frequencies or fluctuations may be obtained. However, the arrangement of Fig. 1 is regarded as entirely satisfactory for the more simple or academic pressure observation and study.

The foregoing discussion of the pressure sensing means or hollow body having wall portions sensitive to pressure conditions existing or developed within the pressure chamber has covered its application where atmospheric pressure or substantially atmospheric pressure exists exteriorly thereof. Additional and equally advantageous uses for this pressure sensing means and associated electrical indicating or recording system include the measurement of atmospheric pressures or hydrostatic pressures. These latter pressure conditions may be sensed if the chamber or cell is sealed or made pressure tight. The pressure sensing device then becomes a sensitive and accurate altimeter or barometer. It is also recognized as possible to affix the strain gauges upon the internal wall surfaces of the pressure chamber and to lead the electrical conductors outwardly through the port provided and through a tube or other means. There is thus achieved a device which may be readily and easily inserted in a tank containing a medium under pressure. A series of these latter devices may be utilized to indicate or sample successive stages of depth or pressure strata. Moreover, it is entirely possible to use the present device as a temperature indicating instrument by the simple expedient of filling the body chamber with a fluid such as alcohol or mercury or other common temperature responsive medium.

It should be understood that the present invention may be used wherever a positive or negative pressure indication or recording is desired and is not limited to the cases where a medium under pressure must be communicated to the interior of the chambered unit. Moreover it is recognized that certain changes and minor modifications may be made or suggest themselves but without departing from the spirit and intended scope of the invention as defined by the appended claims.

What is claimed is:

1. A pressure sensitive means adapted for use with indicating or recording instruments, the pressure sensitive means comprising a body member formed of an outer cylindrical shell structure and an inner cylindrical shell structure arranged to define a cellular space of generally annular extent, one of said shell structures having a port provided therein for the introduction to said cellular space of a medium under pressure, and a pressure seal for the shell structures, said shell structures further having wall portions capable of being deformed by pressure forces acting in a radial direction whereby the circumference of each said structure in the zone of the deformable wall portions may be measurably varied in proportion to the pressure existing in said cellular space and acting upon the deformable wall portions of said shell structures.

2. A pressure sensitive means adapted for use with indicating or recording instruments, the pressure sensitive means comprising a body member formed of an outer cylindrical shell structure and an inner cylindrical shell structure arranged to define a cellular space of generally annular extent, one of said shell structures having a port provided therein for the introduction to said cellular space of a medium under pressure, and a pressure seal for the shell structures, said shell structures further having wall portions capable of being deformed by pressure forces acting in a radial direction whereby the circumference of each said structure in the zone of the deformable wall portions may be measurably varied in proportion to the pressure existing in said cellular space and acting upon the deformable wall portions of said shell structures, and a pair of electrical resistance type strain gages adhered one to the exterior of the deformable wall portion of said outer shell structure and the other to the interior of the deformable wall portion of said inner shell structure.

CHRISTOPHER A. GREEN.